United States Patent
Simon

[11] 3,713,293
[45] Jan. 30, 1973

[54] COMBUSTION CHAMBER AND NOZZLE ARRANGEMENT FOR A ROCKET ENGINE

[75] Inventor: Michael Simon, Hamburg-Othmarschen, Germany

[73] Assignee: Maschinenfabrik Augsburg-Nurnberg Aktiengesellschaft, Munich, Germany

[22] Filed: Oct. 8, 1970

[21] Appl. No.: 79,250

Related U.S. Application Data

[62] Division of Ser. No. 807,703, March 17, 1969, Pat. No. 3,644,974.

[52] U.S. Cl. .................... 60/267, 60/260, 165/142
[51] Int. Cl. ............................................ F02k 11/02
[58] Field of Search ....60/267, 260, 39.66; 29/157 R, 29/157 C; 165/169, 142

[56] References Cited

UNITED STATES PATENTS

| 3,029,602 | 4/1962 | Allen | 60/260 |
| 3,086,358 | 4/1963 | Tumavicus | 60/267 |
| 1,726,020 | 8/1929 | Garvey | 165/142 |
| 3,044,257 | 7/1962 | Shesta | 60/260 |
| 3,349,464 | 10/1967 | Becker et al. | 29/157 C |
| 2,958,183 | 11/1960 | Singlemann | 60/260 |
| 3,235,947 | 2/1966 | Sohleman | 29/157 C |
| 2,611,584 | 9/1952 | Labus | 165/142 |

Primary Examiner—Carlton R. Croyle
Assistant Examiner—Warren Olsen
Attorney—Craig, Antonelli, Stewart & Hill

[57] ABSTRACT

Combustion chamber and nozzle arrangement for a rocket engine having a plurality of main pipes bonded together to form an annular chamber having a nozzle configuration, and a secondary pipe disposed in each main pipe and secured to the inner walls thereof. The secondary pipe and the space between the secondary and main pipes form separate cooling feed and return ducts within each main pipe. The point of interconnection of the main pipes and secondary pipes is disposed outside of a circle formed by the centers of the pipes. In one embodiment of the invention, both the main pipes and the secondary pipes are of similar configuration. Alternative embodiments include filler members disposed between the outer wall of the secondary pipe and the inner wall of the main pipe for restricting the space between the two pipes.

15 Claims, 6 Drawing Figures

PATENTED JAN 30 1973　　　　3,713,293

INVENTOR
MICHAEL SIMON

BY Craig, Antonelli, Stewart & Hill
ATTORNEYS

COMBUSTION CHAMBER AND NOZZLE ARRANGEMENT FOR A ROCKET ENGINE

This application is a division of Ser. No. 807,703 filed Mar. 17, 1969, now U.S. Pat. No. 3,644,974.

The invention comprises a combustion chamber and/or nozzle of a rocket engine and process for manufacture thereof, the inner and outer walls of the combustion chamber and/or nozzle being formed by individual small pipes which run in a longitudinal direction and are joined together, and in which the fuels to be fed into the combustion chamber for combustion are pre-heated or pre-vaporized.

The process as used up to now for manufacturing such a propulsion system which basically consists of a combustion chamber and a nozzle of a rocket engine, required that first each individual small pipe had to be shaped according to the desired combustion chamber and nozzle contour and that, only subsequently, all shaped pipes were brazed or welded together to form the walls of the combustion chamber and nozzle.

The described pre-shaping of each individual small pipe is a time consuming and costly process. Therefore, the present invention is directed to the solution of the problem by developing a process for manufacturing the combustion chamber and/or nozzle of a rocket engine, which is superior to all other previously known processes, in that it reduces manhours and thus manufacturing costs.

In order to solve the problem, the invention proposes that, in a process of the above-mentioned type, a cylindrical chamber would be produced first by brazing or welding the pipes together and only subsequently would the shaping of this chamber according to the desired combustion chamber/nozzle geometry be carried out. Moreover, for regenerative cooled rocket combustion chambers and sub-critical cooling agent pressure values, there is a known requirement that the cooling agent must be pre-vaporized prior to its entry into the cooling duct itself. One difficulty with relatively short expansion nozzles, where pre-vaporization at the nozzle outlet is not possible without danger, is to pre-vaporize the initially liquid cooling agent in a type of feed and return cooling duct by means of the vaporized gaseous cooling agent which subsequently flows back through the cooling duct.

The invention proposes that, with a combustion chamber and/or nozzle which feature feed and return cooling ducts for pre-heating or pre-vaporization of the liquid cooling agent, additional small pipes, e.g. for the cooling agent feed duct are arranged inside those individual small pipes of the cylindrical chamber, which are, e.g. intended to form the cooling agent return duct, this process taking place prior to their shaping to the desired combustion chamber/nozzle geometry, the outer and inner pipes being joined in such a manner that, upon completion of the shaping process, the areas required for brazing or welding will preferably lie on the outer walls of the combustion chamber and/or nozzle.

Furthermore, the invention proposes that, with a combustion chamber and/or nozzle, the feed and return cooling ducts of which feature fillers which provide for the flow sections and cooling agent velocities required to ensure adequate cooling efficiency, all small pipes which, at first, form a cylindrical chamber and are intended to serve as feed and/or return ducts for the cooling agent, are provided with suitable fillers prior to their shaping to the desired combustion chamber and/or nozzle geometry.

It is an object of the present invention to provide a process for manufacture of the combustion chamber and/or nozzle of a rocket engine which substantially eliminates the disadvantages inherent in prior known processes.

It is another object of the present invention to provide a process of the type described in which a substantial reduction in manufacturing time and cost is achieved.

It is a further object of the present invention to provide a process of the type described wherein shaping of the combustion chamber and/or nozzle is effected only after assembly of the components thereof.

It is still another object of the present invention to provide a novel combustion chamber and/or nozzle construction as made by the above-mentioned process.

These and other objects features and advantages will become apparent from the following detailed description thereof when taken in conjunction with the accompanying drawings which illustrate the features of the present invention, and wherein.

Figure 1:
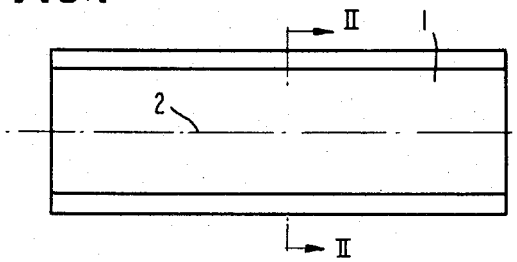
FIG. 1 is a longitudinal sectional view of a chamber representing a first stage of manufacture.
Figure 2:
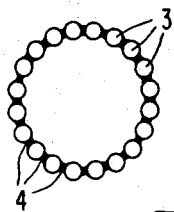
FIG. 2 is a section taken along line II—II of FIG. 1.

Turning now to the more specific features of the invention in conjunction with the drawings, FIGS. 1 and 2 illustrate a chamber 1, initially of cylindrical shape, consisting of individual, narrowly spaced small pipes 3, coaxially arranged with regard to the longitudinal centerline 2 of the chamber. The straight pipes 3 are welded or brazed together initially, for example at contact areas 4, to form the substantially cylindrical chamber.

Figure 3:
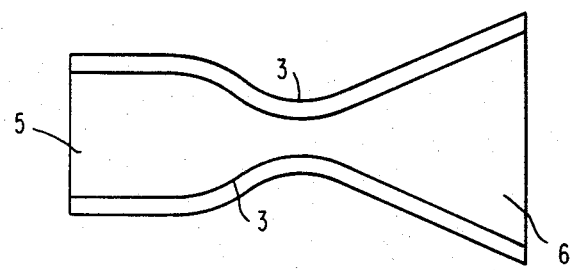
FIG. 3 is a longitudinal sectional view of the chamber of FIG. 1 after having been shaped in accordance with the present invention.

In the next stage of the process the chamber 1, formed by individual pipes 3, is shaped according to the desired combustion chamber nozzle geometry (FIG. 3) by means of an apparatus, not illustrated on the drawings. The combustion chamber section is designated 5 and the nozzle section 6. Thus, the need to individually shape the small pipes forming the chamber prior to assembly which resulted in the great expenditure of time and cost is eliminated in a relatively simple manner.

Figure 4:
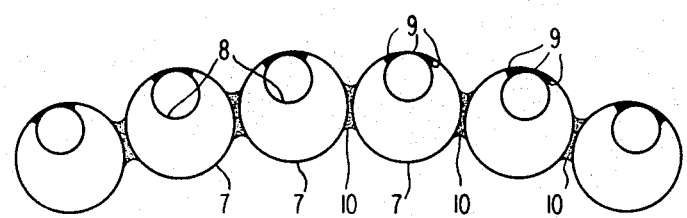
FIGS. 4, 5 and 6 are partial cross-sectional views through the chamber illustrating various structural embodiments of the invention.

FIG. 4 shows, as a structural embodiment, a partial cross-section of a combustion chamber/nozzle casing. The only variation of this embodiment as compared to the one shown in FIG. 2, is the arrangement of additional small pipes 8 inside pipes 7. Pipes 7, for example, may be used as cooling agent feed ducts, while the inner pipes 8 may be used as cooling agent return ducts. In addition, FIG. 4, shows that pipes 7 and 8 are brazed or welded together at areas 9, i.e. at the outer wall of the combustion chamber/nozzle casing inner and outer walls formed by pipes 7. By fixing pipes 8 at areas 9, i.e., at points along the outer periphery of the chamber, it is accomplished that the brazed or welded joints required for fixing pipes 8 are not immediately subjected to the high temperatures which are primarily encountered during operation at the inner walls of the combustion chamber/nozzle casing. Pipes 7 are narrowly spaced and brazed or welded together at areas 10.

Figure 5:
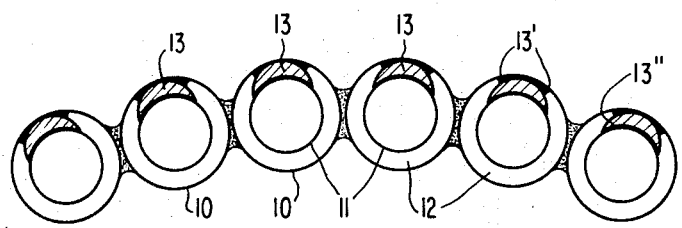

FIG. 5 shows a further partial cross-section of a combustion chamber/nozzle casing which differs from the embodiment illustrated by FIG. 4 in that fillers 13 are arranged in spaces 12, formed by outer pipes 10 and inner pipes 11, in order to reduce the flow areas of spaces 12, formed by pipes 10 and 11, at certain areas of the combustion chamber or nozzle. Brazed or welded areas for fixing fillers 13 in spaces 12 onto the walls of outer and inner pipes 10 and 11 are designated 13' and 13'', respectively.

Figure 6:
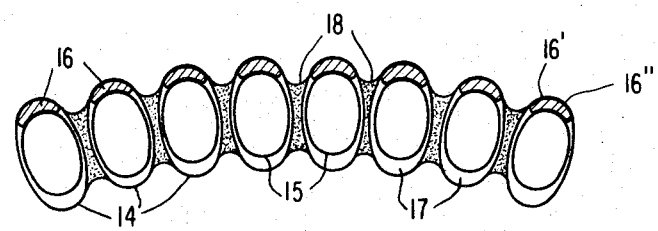

In a further structural embodiment illustrated in FIG. 6 outer pipes 14 and inner pipes 15 are provided with elliptic sections as illustrated by the partial cross-section of the combustion chamber/nozzle casing. Fillers 16 are arranged between pipes 14 and 15 in such a manner that only cross-sections 17 remain open for the fuel flow through pipes 14. Pipes 14 are brazed or welded together at areas 18 to form an integral combustion chamber/nozzle unit. The brazed or welded joints for securing fillers 16 to the walls of outer pipes 14 in spaces 17 and also to the walls of inner pipes 15 are designated 16' and 16'', respectively.

It should be noted that fillers 13 and 16, shown in FIGS. 5 and 6, need not necessarily extend over the total length of the inside of associated pipes 10 and 14, but may be arranged only at predetermined areas inside pipes 10 and 14, in such a manner as to ensure adequate cooling of those zones of the combustion chamber/nozzle walls especially subjected to high temperatures.

While I have shown and described several embodiments in accordance with the present invention, it is understood that the same is not limited thereto but is susceptible of numerous changes and modifications as known to a person skilled in the art, and we therefore do not wish to be to the details shown and described herein but intend to cover all such changes and modifications as are within the scope of a person skilled in the art.

I claim
1. A combustion chamber and nozzle arrangement of a rocket engine comprising:
   a plurality of main pipes bonded together to form an annular combustion chamber wall having a nozzle configuration, and
   a secondary pipe disposed in each main pipe and secured thereto, thereby forming separate cooling feed and return ducts within each main pipe.
2. An arrangement as defined in claim 1, wherein filler members are inserted between said secondary pipes and said main pipes to restrict the space therebetween.
3. An arrangement as defined in claim 2, wherein said main pipes and said secondary pipes are of oval configuration, the major axis of said oval shape extending substantially radially of said combustion chamber.
4. An arrangement according to claim 3 wherein said filler members are disposed outside of a circle formed by the centers of said major axes of said main pipes.
5. An arrangement as defined in claim 1 wherein the point of interconnection of said main pipes and secondary pipes is disposed outside of a circle formed by the centers of said main pipes.
6. An arrangement according to claim 1 wherein each of said secondary pipes are secured directly to the inner walls of respective ones of said main pipes.
7. An arrangement according to claim 1 wherein each of said secondary pipes are connected at the outer walls thereof to filler member means, and wherein said filler member means are disposed within said main pipes and are connected to inner walls of said main pipes.
8. An arrangement according to claim 7 wherein said filler member means include a plurality of separate filler pieces spaced from one another along each of said respective main and associated secondary pipes.
9. An arrangement according to claim 8 wherein said filler pieces are disposed outside of a circle formed by the centers of said main pipes.
10. An arrangement according to claim 7 wherein said filler member means are disposed outside of a circle formed by the centers of said main pipes.
11. An arrangement according to claim 1 wherein each of said main pipes is completely closed around the circumference thereof, each of said respective secondary pipes being disposed completely inside of the closed circumference of the respective one of said main pipes, the outer surface of each respective secondary pipe being fixedly attached to an inner surface of the respective surrounding main pipe.
12. An arrangement according to claim 11 wherein said main and secondary pipes have similar cross-sectional shapes.
13. An arrangement according to claim 12 wherein each main pipe is attached at opposite sides of its outer circumference to two respective adjacent main pipes, one adjacent main pipe at each opposite side.
14. An arrangement according to claim 1 wherein said secondary pipes form one of said respective separate cooling feed and return ducts, and the space between the outer walls of said secondary pipes and the inner walls of respective main pipes forms the other of said separate cooling feed and return ducts.
15. An arrangement according to claim 1 wherein outer surfaces of said main pipes form interior walls of the combustion chamber and nozzle.

* * * * *